Patented May 25, 1926.

1,586,486

UNITED STATES PATENT OFFICE.

HARRY S. THATCHER, OF LOS ANGELES, CALIFORNIA, AND SAMUEL E. JOSI, OF CHICAGO, ILLINOIS, ASSIGNORS TO THE CELITE COMPANY, OF LOS ANGELES, CALIFORNIA, A CORPORATION OF DELAWARE.

PROCESS OF TREATING SUGAR-BEET DIFFUSION JUICE.

No Drawing.  Application filed August 22, 1923. Serial No. 658,835.

This invention relates to the manufacture of beet sugar by the diffusion process and the main object of the invention is to improve the filtration operations required in treatment of beet sugar diffusion juice in such a manner as to increase the yield and quality of sugar and effect various economies in the process.

A further object of the invention is to provide for the separation of certain constituents of the diffused juice produced in beet sugar manufacture, for example, such constituents as are in a suspended state or in colloidal solution, namely, gums, pectin, certain acids, and coloring matter, thereby expediting and improving the subsequent purifying and crystallizing operations and increasing the yield and quality of the sugar produced.

The above described objects are attained according to our invention by heating the diffusion juice and passing the heated juice through a bed of diatomaceous earth prior to chemical defecation of such juice.

The action of the process above described may, in some instances be improved by adding diatomaceous earth to the diffusion juice when in a heated condition, and carrying on the filtering or separating operation while the said diffusion juice is in such heated condition.

The filter-aid or filtering medium which we prefer to use consists of diatomaceous earth in a ground, pulverized, or finely divided condition and either in its raw state or in calcined condition or otherwise suitably prepared to increase its filtration capacity. We have obtained particularly advantageous results by the use of diatomaceous earth which has been first ground to finely divided condition and then calcined to a temperature of about 1800° F. and then reground. We have also obtained very satisfactory results by the use of a material consisting of diatomaceous earth which has been ground, mixed with sodium chloride in suitable proportions, (about 5% of the weight of the diatomaceous earth) which is calcined at a temperature of about 1800° F. and then reground. In any case the diatomaceous earth or material prepared therefrom should be in the condition of fine division, for example, about 70% through 120 mesh.

Our process may be carried out as follows:
The diffusion juice coming from diffusion battery as in ordinary diffusion process of extracting sugar from the beets is kept hot by a series of heaters between each diffusion cell, up to the drawing off of juice from battery to measuring tank. This whole process is an enclosed process.

We preferably extend this enclosed system to include a large heater, or series of heaters, to raise temperature of the diffusion juice very quickly just before passing through an enclosed filter (filter-press) of the plate and frame type or clam shell, or any other type of enclosed filter apparatus. The temperatures employed in heating juice in the above mentioned heater vary from 150° to 250° F. (and in any case, preferably below 270° F.) depending upon the physical condition and sugar content of beets. The temperatures employed on a diffusion battery vary from hour to hour through the entire campaign. So also the temperatures on heater vary due to same reasons—physical condition, sugar content and purity of beets. But it is a part of the intention of this invention to provide large heating area so that a quick, sudden rise in temperature may be had to coagulate albuminoids, attack the pectin present (this is mucilaginous in character and undoubtedly molassigenic in effect when brought in contact with lime as is done at present) throw down organic colloids, organic lime salts and other impurities.

The diffusion juice is drawn through the heater by suction from a large, slow moving centrifugal pump, or other pump may be used. On the suction end of this pump and close to the pump, another line is connected in such a way that the suspension of filter-aid, made up of filtered diffusion juice mixed thoroughly with the above described diatomaceous earth, can be drawn gradually into the liquor to be filtered. The suspension tank must have proper mixing device which consists of a propeller, or mixing arms, driven from above by gears or other means. This tank must be sealed except for a small hole in the top through which the filter-aid is passed from a small mixer.

This small mixer may be the usual type of dry mixer for the introduction of filter-aid into the liquor. This apparatus is used because a definite quantity can be fed constantly, depending upon the opening of the hole leading into the suspension tank. Another type of proportioning apparatus consists of a scroll feed from a hopper bottom, the amount of material being forced into the tank being regulated by the speed of the screw.

The suspension tank is fed continuously with filtered diffusion juice from a line connected to the outlet line of the filter and a small stream of this diffusion juice will run into the suspension tank constantly at the same time that the filtered-aid is being added to the suspension. From the suspension tank is a valve that will be partially open allowing a steady flow to run into the suction end of the pump for the purpose of constantly building up a cake in the filter that will be kept open and porous at all times.

This method of introducing the suspension into the suction end of the pump has the tendency to distribute the filter-aid very thoroughly through the liquor before it passes into the filter. The amount of filter-aid required for thorough purification of the diffusion juice will vary from 0.5% to 2% on weight of the beets from which the juice is derived, the variation being due to the physical condition and purity of the beets and juice. Any type of filter (filter-press) may be used as long as it is an enclosed system—either pressure or vacuum.

It is thus seen that the operations of heating, mixing the diatomaceous earth with the juice, and filtering are carried out with exclusion of air.

We have found that when a new filter is cut in, the operation is facilitated by precoating the press with a small amount of filter-aid. For this purpose a tank having cubical volume slightly in excess of the volume of the filter press and piping, equipped with agitators and a feeding arrangement for the filter-aid is connected by suitable pipe means to the inlet of the filter press. Clean filtered diffusion juice is admitted to the tank, a predetermined amount of filter-aid thoroughly mixed in and the suspension thus formed pumped through a clean empty press, the discharge being returned to the precoating tank. After the filter-aid is deposited on the cloth, the heated diffusion juice is sent through the press. We find that the quantity of filter-aid required to maintain an open porous cake, can be very materially reduced after the filter has been precoated.

The purpose of working a completely enclosed system is to prevent contamination of the diffusion juice with the air while the juice is in acid condition. It is extremely desirable that the diffusion juice at the temperatures that we prefer to work, does not come in contact with the atmosphere until it enters the carbonation. To further prevent oxidation of the raw juice, we prefer to eliminate the open top measuring tanks generally used in beet sugar work and instead, use an enclosed type of recording flow meter between the filter presses and the carbonation tanks. In this way the beet juice does not come in contact with the air, and is kept hot until it reaches the defecation tanks. The darkening of raw diffusion juice when exposed to the air is attributed to the action of oxydases upon certain constituents present in the juice. This darkening is eliminated to a certain extent by our process in that the operation is carried on out of contact with the air and some enzymes removed by the filtration through diatomaceous earth. This filtration process must be carried on as rapidly as possible because diffusion juice is very susceptible to bacterial action. The filter-aid proposed removes completely any bacteria or micro-organisms in the solution. However, diffusion juice must not remain in the pipe lines, or in the filters, or in the tanks unless it is kept hot and should always be kept moving, if possible. Although the above method is preferred, it may be found necessary in some plants to operate with open measuring tanks or other equipment which allow the air to come in contact with the diffusion juice while undergoing treatment, and our invention includes such modification.

The press cake of diatomaceous earth resulting from this operation may be recovered, where practicable, and again used. Recovery may be accomplished by disintegrating, drying, pulverizing and calcining suitable equipment with or without the addition of foreign substances, and under such oxidizing or reducing conditions as may be found necessary.

The purpose of filtering so completely and at the temperatures suggested is to remove all suspended matter, including substances in colloidal suspension. The suspended matter in diffusion juice usually includes small particles of cell walls, fibrous matter detached from the cossettes in the diffusion operation, and also certain gums or colloidal substances which pass into the diffusion juice from the cossette by reason of the rupture of the cell walls of the beet substances. These colloidal combinations are extremely objectionable in the subsequent operations for the production of a high grade beet sugar from diffusion juice, as they interfere with the proper defecation of the liquor. They also interfere with the eventual crystallization of the sugar.

When the diffusion juice is brought into the first carbonation and a very large excess of lime is added, many compounds are formed immediately because of this combination of lime and diffusion juice in an acid condition. Unquestionably some of these compounds pass through the entire operation and carry on through to the molasses. Organic lime salts are formed in the usual practice of handling diffusion juice in the first carbonation due to the presence of a very large percentage of organic matter going through with the diffusion juice and brought in contact with the lime at high temperatures.

One of the principal functions of our invention is the complete removal of all this organic matter that comes out in the diffusion juice, so that the diffusion juice entering the carbonation is as pure as it is possible to make it without chemical defecation. There is no question but that this process eliminates largely the need for subsequent chemical defecation because of the physical removal of impurities present at this stage. However, as stated above, an important object of the filtration process is to facilitate and improve the chemical defecation by removing from the juice certain impurities which if not removed, interfere with the most efficient chemical purification, increase the amount of chemicals required for this purpose and hence increase the amount of precipitate formed and cause high loss of sugar, and form injurious products in the juice during defecation. In general, therefore, we prefer to follow the filtration process as above described by the usual operations of liming and carbonation. It should be noted, however, that the heating and filtering operations above described are carried out without the addition of any chemical reagents to the juice, and that the subsequent chemical defecation takes place after the impurities above mentioned have been removed, thus preventing the formation of injurious products.

After the diffusion juice has been treated as above described, including filtration followed by liming and carbonation, to more or less completely remove suspended material including colloids therefrom the diffusion juice may be subjected to the ordinary evaporating and crystallization operations now in use in beet sugar manufacture. In general, however, it will not be necessary to use as much lime in the primary treatment of the diffusion juice which has been treated as above described as in the case when operating with ordinary diffusion juice as now produced, and in the subsequent carbonation and increasingly smaller amount of carbon dioxide can be used. After the carbonatation the second filtration or separation may be effected for removing the excessive lime and any materials precipitated by the liming and carbonating operations including such organic substances, colloids or otherwise which are carried down as precipitated lime compounds or carried down with or occluded in the lime precipitate. In such second filtration diatomaceous earth as above described may be used as a filter-aid if desired, being mixed with the diffusion juice before, during, or after liming, or before, during or after carbonatation and operating to expedite and render more effective the filtration operation. The filtered liquor is thereafter subjected to evaporating and crystallizing operations to separate sugar therefrom.

The usual process which the diffusion beet juice is given is to treat it with lime and carbonic acid with the formation of a precipitate that not only acts as a filtering medium but which also to a certain extent adsorbs impurities. There is a positive increase in purity of the juice given in this treatment, this increase in purity being a resultant increase rather than an absolute increase due to the process itself. In other words the action of the lime on the juice ordinarily reduces the purity of the liquor but the formation of the calcium carbonate in excess quantities removes a certain amount of the impurities formed and in addition picks up further impurities from the liquor so that the resulting action is an increase in the purity. By starting with a cleanly filtered liquor, necessarily the lime and gas treatment will produce first carbonation juices of high purity and better color. There will be less organic salts in solution due to the absence of the organic matter which the lime would attack. In this way the entire operation of the beet house is helped by the initial filtration of the beet juice. The syrups are cleaner and contain less salts so that there is a greater recovery of sugar.

The advantages of the initial filtration would be in the removal of suspended beet root particles; foreign organic or inorganic matter; removal and adsorption of colloidal materials; bacteria; consequent reduction in viscosity of filtered beet juice due to removal of colloidal and other material.

In some cases the diffusion juices which have been treated with filter-aid (diatomaceous earth) as above described for more or less complete removal of suspended material including colloids are of sufficient purity after such treatment to enable liming and carbonatation operations to be dispensed with. In such case the diffusion juice treated as described may be sent directly to the evaporators and then treated with decolorizing carbon to further bleach and purify the juice. For example, the diffusion juice after having been heated in the absence of air and mixed with the filtration aid and subjected to filtration or other separating operation whereby the filter-aid together with the suspended matter including colloids are removed from the diffusion juice, can be passed through suitable evaporators and the thick juice thus formed intimately mixed with a decolorizing carbon or a mixture of diatomaceous earth and a carbon and again filtered to effect a separation between the decolorizing agent and the solution. In this manner coloring matters of the juice, gums and other colloids precipitated during evaporation are removed and the sugar solution is then subjected to further evaporation and crystallization for the production of sugar without the necessity of purification with the use of liming and carbonatation. Cheap recolorizing carbons are now being produced so that the filtered diffusion juices can be economically treated with carbon instead of lime and gas. This treatment gives an increase in purity and the filtered decolorized juice after being concentrated to a syrup is again treated with a diatomaceous earth and decolorizing carbon mixture after which it is then ready to be boiled into sugar.

However, whether my invention be carried out so as to include a chemical defecation following the filtration, or whether the filtered juice be next evaporated and then further purified, for example by means of decolorizing carbon, it is important and advantageous to carry out the heating, the mixing of the diatomaceous earth with the juice, and the filtering entirely in closed apparatus, so as to prevent contact of air with the juice and thereby eliminate darkening thereof as above described.

What we claim is:

1. In the manufacture of beet sugar by the diffusion process, the method of purifying diffusion juice which comprises heating such diffusion juice, forming on the filtering surfaces of a filtering apparatus a coating of diatomaceous earth by passing through such apparatus a suspension of diatomaceous earth in purified beet juice, and then passing such heated diffusion juice through said coating of diatomaceous earth.

2. In the manufacture of beet sugar by the diffusion process the method of purifying diffusion juice which comprises heating such juice to a temperature between 150 and 270° F., forming on the filtering surfaces of a filtering apparatus a coating of diatomaceous earth by passing through such apparatus a suspension of diatomaceous earth in purified beet juice and passing said heated diffusion juice through said coating of diatomaceous earth while maintaining such juice at a temperature between 150 and 270° F.

3. The method of purifying diffusion juice as set forth in claim 2 in which the formation of the coating of diatomaceous earth and the heating and filtration of the diffusion juice are carried out under a condition of exclusion of atmospheric air.

4. In the manufacture of beet sugar by the diffusion process, the method of purifying diffusion juice which comprises forming on the filtering surfaces of a filtering apparatus a coating of diatomaceous earth by passing through such apparatus a suspension of diatomaceous earth in purified beet juice, mixing diatomaceous earth with heated diffusion juice, and subjecting the mixture to filtration through said coating of diatomaceous earth.

HARRY S. THATCHER.
SAMUEL E. JOSI.